(12) United States Patent
Sumner et al.

(10) Patent No.: US 12,425,354 B2
(45) Date of Patent: Sep. 23, 2025

(54) DYNAMIC RESOURCE MANAGEMENT IN A RESOURCE SYSTEM

(71) Applicant: T-Mobile USA, Inc., Bellevue, WA (US)

(72) Inventors: Robert Jackson Sumner, Bellevue, WA (US); Nathan D'Ambrosia, Bellevue, WA (US); Keegan Dunn, Bellevue, WA (US); Vandana Jain, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 450 days.

(21) Appl. No.: 18/147,646

(22) Filed: Dec. 28, 2022

(65) Prior Publication Data
US 2024/0223511 A1 Jul. 4, 2024

(51) Int. Cl.
*H04L 47/80* (2022.01)
*H04L 47/70* (2022.01)
*H04M 3/523* (2006.01)

(52) U.S. Cl.
CPC .......... *H04L 47/808* (2013.01); *H04L 47/822* (2013.01); *H04L 47/826* (2013.01); *H04M 3/5238* (2013.01)

(58) Field of Classification Search
CPC ... H04L 47/808; H04L 47/822; H04L 47/826; H04M 3/5238
See application file for complete search history.

(56) References Cited

U.S. PATENT DOCUMENTS

| | | |
|---|---|---|
| 8,655,880 B2 | 2/2014 | Arora |
| 9,626,361 B2 | 4/2017 | Greenwood et al. |
| 9,766,769 B1 | 9/2017 | Webber et al. |
| 9,838,399 B2 | 12/2017 | Bakshi et al. |
| 9,852,452 B2 | 12/2017 | Lin et al. |
| 10,296,547 B2 | 5/2019 | Richter et al. |
| 10,356,074 B2 | 7/2019 | Dravneek et al. |

(Continued)

FOREIGN PATENT DOCUMENTS

| | | |
|---|---|---|
| CN | 106503085 B | 4/2020 |
| CN | 105528379 B | 9/2020 |

(Continued)

*Primary Examiner* — Sam Bhattacharya
(74) *Attorney, Agent, or Firm* — Perkins Coie LLP

(57) ABSTRACT

The disclosed technology relates to providing dynamic interfaces of curated sets of resources for users. The dynamic interfaces can have an effect of reducing a volume of communication sessions initiated with a customer support system. In an example, a resource system associated with data resources (e.g., webpages, documentation) identifies particular data resources that are predicted to be relevant for a given user. The particular data resources are predicted to be relevant for the given user based on the particular data resources being exclusively accessed by historical users who are not active in initiating communication sessions (versus other historical users who are active in initiating communication sessions). Historical users belonging to a same user cohort as the given user are classified as active or non-active in order to identify the particular data resources. The resource system provides a dynamic interface that presents the relevant data resources to the given user.

20 Claims, 6 Drawing Sheets

(56) References Cited

U.S. PATENT DOCUMENTS

| | | |
|---|---|---|
| 10,423,690 B2 | 9/2019 | Kovalev |
| 10,558,727 B2 | 2/2020 | Tarasov et al. |
| 10,817,884 B2 | 10/2020 | Reeves |
| 11,055,145 B2 | 7/2021 | Cantley et al. |
| 11,144,862 B1 | 10/2021 | Jackson et al. |
| 11,151,217 B2 | 10/2021 | Ziraknejad et al. |
| 11,188,923 B2 | 11/2021 | Bansal et al. |
| 11,489,682 B2 | 11/2022 | Griffin et al. |
| 2013/0080949 A1 | 3/2013 | Gibbins et al. |
| 2014/0074922 A1 | 3/2014 | Bell |
| 2014/0302470 A1 | 10/2014 | Zapantis et al. |
| 2014/0359531 A1 | 12/2014 | Xiang |
| 2015/0169701 A1 | 6/2015 | Stekkelpak et al. |
| 2016/0026727 A1 | 1/2016 | Bar-yossef et al. |
| 2016/0034305 A1* | 2/2016 | Shear .................. G06F 9/50 707/722 |
| 2016/0210602 A1* | 7/2016 | Siddique ............... G16H 10/60 |
| 2018/0260922 A1* | 9/2018 | Tozzi ................. G06Q 50/182 |
| 2018/0357072 A1 | 12/2018 | Karnati et al. |
| 2020/0012714 A1 | 1/2020 | Anhorn et al. |
| 2020/0065825 A1 | 2/2020 | Douglas |
| 2021/0232659 A1 | 7/2021 | Jastrzebski et al. |
| 2021/0334369 A1 | 10/2021 | Keiter et al. |
| 2022/0091712 A1 | 3/2022 | Lee et al. |
| 2022/0357961 A1 | 11/2022 | Ragotte |

FOREIGN PATENT DOCUMENTS

| | | |
|---|---|---|
| CN | 111899047 A | 11/2020 |
| CN | 112989146 A | 6/2021 |
| CN | 107092620 B | 11/2021 |
| CN | 113722498 A | 11/2021 |
| CN | 110674386 B | 11/2022 |
| EP | 2474920 A2 | 7/2012 |
| EP | 3669267 A1 | 6/2020 |
| EP | 3901840 A1 | 10/2021 |
| EP | 3905069 A2 | 11/2021 |
| JP | 2020017279 A | 1/2020 |
| WO | 2014168659 A1 | 10/2014 |
| WO | 2014190739 A1 | 12/2014 |
| WO | 2016036345 A1 | 3/2016 |
| WO | 2017054094 A1 | 4/2017 |
| WO | 2020180932 A1 | 9/2020 |
| WO | 2021126434 A1 | 6/2021 |

* cited by examiner

DYNAMIC RESOURCE MANAGEMENT IN A RESOURCE SYSTEM

BACKGROUND

Support systems, platforms, and networks connect with user devices during communication sessions in which users of the user devices request solutions to problems that the users are experiencing. Due to finite levels of computing and network capacity at a support system, a maximum number of user devices that can be supported and that can communicate with the support system at a time exists. In example scenarios in which a large number of user devices request connection with a support system, some user devices spend time waiting in a queue until communication with the support system becomes available, which leads to inefficiency, operational delays, and resource waste.

BRIEF DESCRIPTION OF THE DRAWINGS

Detailed descriptions of implementations of the present invention will be described and explained through the use of the accompanying drawings.

Figure 1:
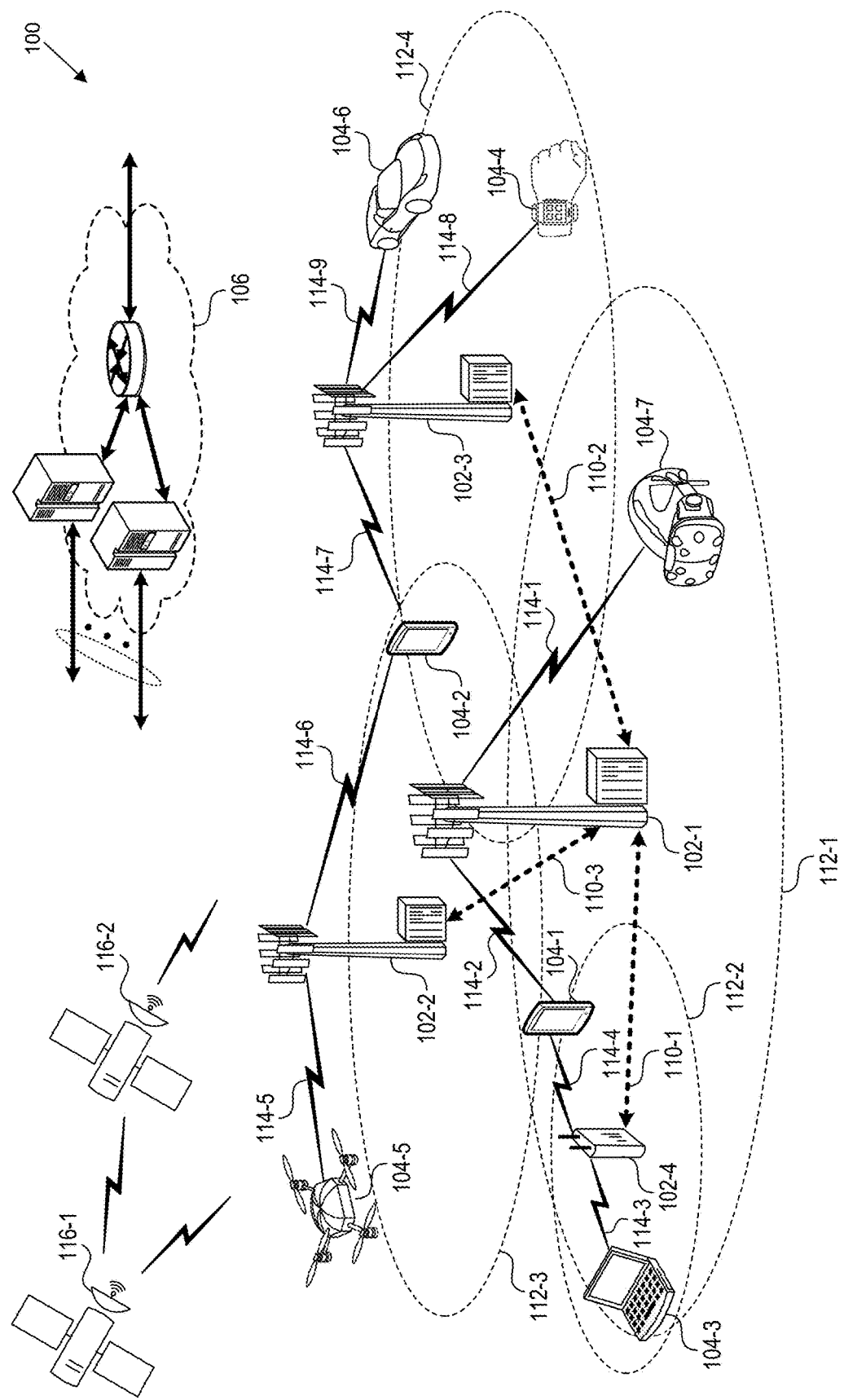
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology relates to providing intelligently configured interfaces at user devices to provide access to customized sets of resources in a resource system. The interfaces provided at a user device include data resources that are intelligently selected for the user of the user device. In particular, the data resources are intelligently selected based on an expectation or prediction that the data resources address problems that would otherwise cause the user to initiate a communication session with a support system. Consequently, providing such dynamic interfaces to multiple user devices can result in fewer user devices initiating communication sessions with the support system, thereby improving load and operational efficiency of the support system.

Accordingly, the disclosed technology provides various technical benefits that can be enjoyed at least at a support system and a communications network. Embodiments of the disclosed technology as described herein beneficially improve navigation of a resource system, reduce a volume of communication sessions that are processed by the support system and the communications network, or provide other benefits. For example, through the intelligent selection of specific data resources that are expected or predicted to reduce initiation of communication sessions on a user-specific basis, an overall volume or load of communication sessions directed to a support system is reduced.

In some implementations, the intelligent selection of data resources to provide to a given user device of a given user is guided by communication activity of historical users or other users. Specifically, data resources that were retrieved or accessed by other users who did not initiate a communication session thereafter are deemed to be important or helpful to users, and these particular data resources are selected to provide to the given user device. More so, in some examples, data resource that were exclusively retrieved by such non-active users (e.g., not retrieved by active users) are predicted to be relevant to users.

Further, selection and provision of particular data resources is unique to user cohorts to which the given user belongs, in some implementations. For example, user cohorts are defined by user tenure, or a length of time since a creation of account data or profile data for each user of a service. Users of similar tenure with the same service (e.g., early tenure users) tend to initiate communication sessions for similar reasons. As such, for a given user belonging to a particular tenure cohort, resource retrieval behavior of other users of the same tenure cohort are used to intelligently select data resources to provide to the given user device of the given user. In some implementations, cohorts are additionally or alternatively defined by other user characteristics or attributes, including demographic attributes, types of user devices, user account types, and/or the like. With cohort-specificity, intelligence and predictive accuracy of the selection of data resources to provide to a given user is improved.

Thus, implementations disclosed herein provide technical benefits through dynamically curated lists of resources being provided to users. More particularly, implementations disclosed herein promote extraction of existing information that is present in data resources provided to users, with the existing information expected to reduce the users' need to initiate a communication session with a support system. Embodiments disclosed herein then reduce a number of communication sessions initiated by user devices whose users resort to initiating communication sessions with a support system instead of locating and referring to data resources.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Example Wireless Communications Systems

FIG. 1 is a block diagram that illustrates a wireless telecommunication network 100 in which aspects of the disclosed technology are incorporated. The wireless telecommunication network 100 facilitates a communication session between user devices and a support system, platform, or network (e.g., a customer support platform). In some examples, communication sessions between user devices and the support system (e.g., via the wireless telecommunication network 100) include voice calls, instant messaging sessions, video meetings, and/or the like. Embodiments disclosed herein reduce a volume of communication sessions between user devices and support systems, thereby promoting efficiency and capacity of the wireless telecommunication network 100, for example.

In some implementations, the wireless telecommunication network 100 is used to communicate and/or provide select data resources to user devices. For example, a selection of data resources is communicated across the wireless telecommunication network 100 to user devices such that a display interface that visually indicates selected data resources is displayed at the user devices. In some implementations, the wireless telecommunication network 100 is used while users at user devices access data resources. In some examples, the data resources include webpages, and user devices transmit requests to retrieve the webpages via the wireless telecommunication network 100.

The wireless telecommunication network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The wireless telecommunication network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of the wireless telecommunication network 100 also include wireless devices 104-1 through 104-7 (referred to individually as "wireless device 104" or collectively as "wireless devices 104") and a core network 106. The wireless devices 104-1 through 104-7 can correspond to or include network entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The wireless telecommunication network 100 can include base stations of different types (e.g., macro and/or small cell base stations). In some implementations, there can be overlapping geographic coverage areas 112 for different service environments (e.g., Internet-of-Things (IOT), mobile broadband (MBB), vehicle-to-everything (V2X), machine-to-machine (M2M), machine-to-everything (M2X), ultra-reliable low-latency communication (URLLC), machine-type communication (MTC), etc.).

The wireless telecommunication network 100 can include a 5G network and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The wireless telecommunication network 100 can thus form a heterogeneous network in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the wireless telecommunication network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the wireless telecommunication network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network equipment at the edge of the wireless telecommunication network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in wireless telecommunication network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the wireless telecommunication network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the wireless telecommunication network 100 implements 6G technologies including increased densification or diversification of network nodes. The wireless telecommunication network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the wireless telecommunication network 100 can support terahertz (THz) communications. This can support wireless applications that demand ultrahigh quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the wireless telecommunication network 100 can implement a converged Radio Access Network (RAN) and Core architecture to achieve Control and User Plane Separation (CUPS) and achieve extremely low User Plane latency. In yet another example of 6G, the wireless telecommunication network 100 can implement a converged Wi-Fi and Core architecture to increase and improve indoor coverage.

Example 5G Core Network Functions

Figure 2:
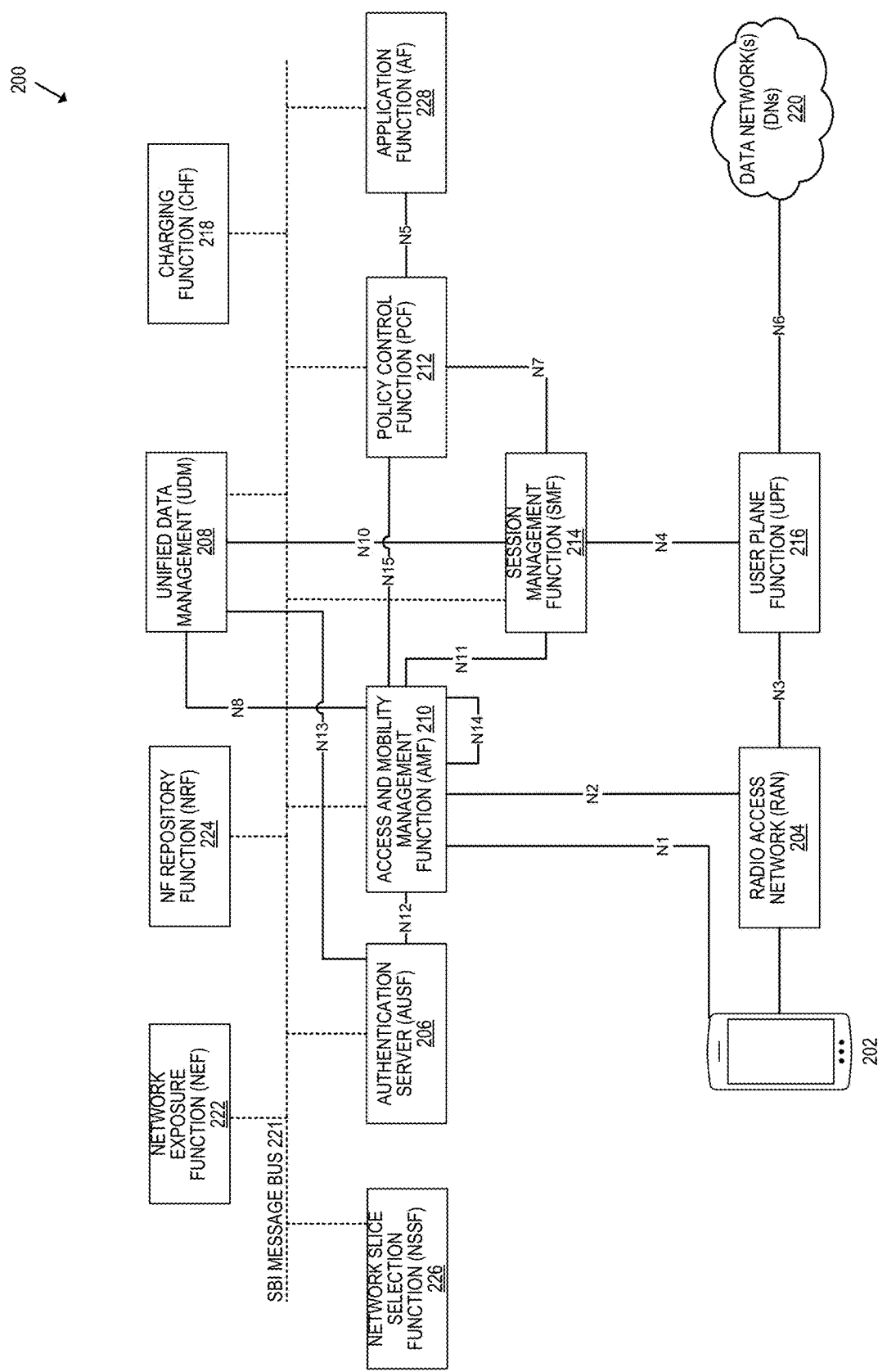
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224 a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has predetermined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make-up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes Network Slice selection, which is regulated by the NSSF 226.

Example Systems for Dynamic Resource Management

Figure 3:
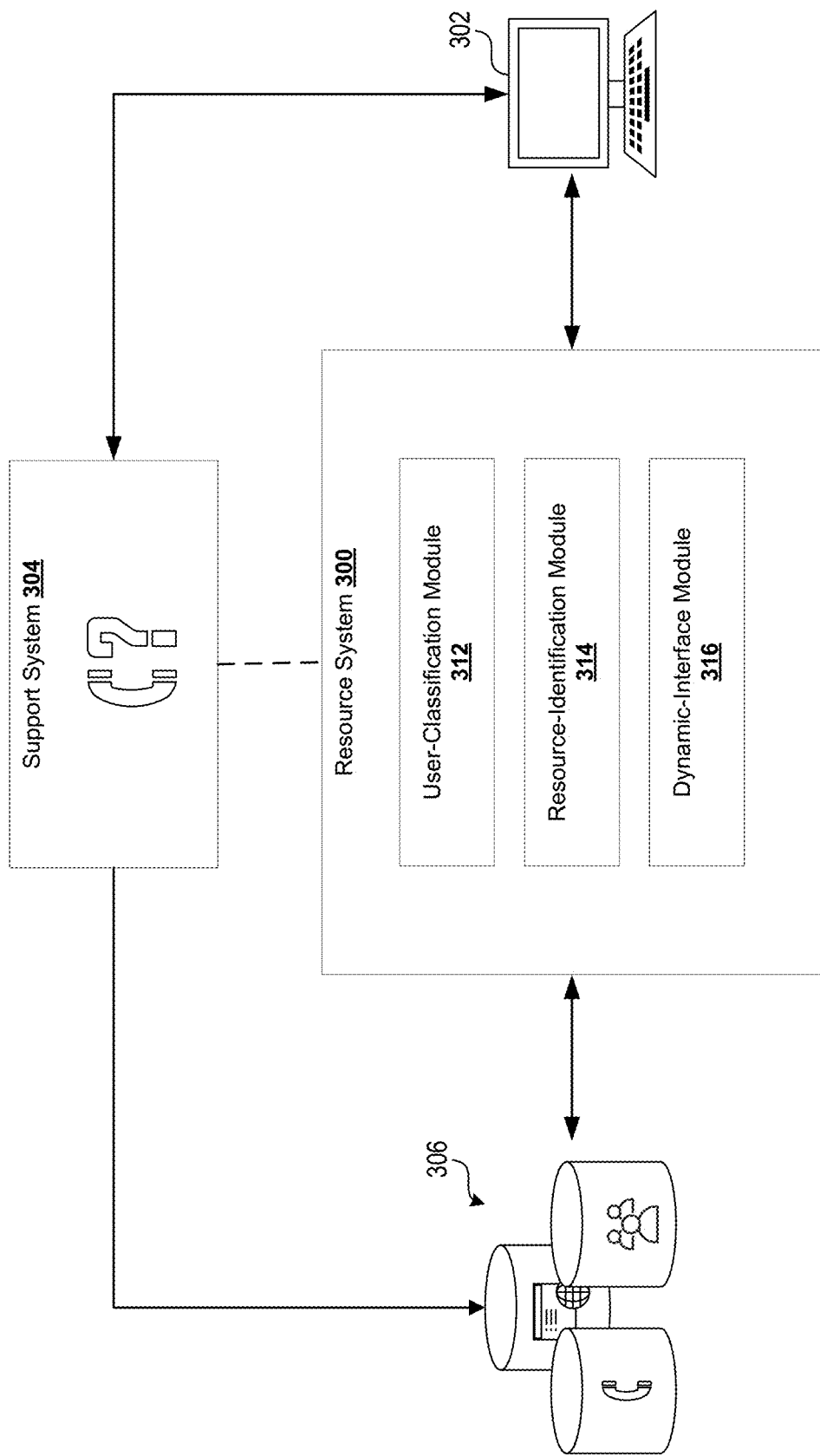
FIG. 3 is a block diagram that illustrates a resource system configured to provide dynamic interfaces to reduce communication session volume, according to some implementations.

FIG. 3 is a block diagram that illustrates an environment in which a resource system 300 provides dynamic interfaces for curated lists of resources to user devices 302, according to some implementations. According to aspects of the disclosed technology, the resource system 300 is associated with a plurality of data resources used by users. For example, the resource system 300 is associated with a library, a database, a documentation, and/or the like, and the resource system 300 provides, hosts, manages, curates, generates, transmits, and/or the like the data resources for the users. In some implementations, the data resources associated with the resource system 300 include information in the form of webpages, videos, interactable resources, manuals or documents, and/or the like. For example, the resource system 300 includes one or more web servers that store information provided in webpages, and the users access the webpages via a network (e.g., the internet). In some implementations, the resource system 300 and the user devices 302 communicate via a network such that users at the user devices 302 consume the information provided by the resource system 300.

The resource system 300 dynamically generates interfaces to facilitate navigation to selected resources within the resource system 300. In some implementations, the resources within the resource system 300 are available through webpages in a website, and the resource system 300 generates a dynamic webpage with links to one or more other webpages containing selected resources. Other implementations of a dynamic interface generated by the resource system 300 include portions of a webpage, a modal window associated with a webpage (e.g., a window in which a chatbot conversation is displayed), or an interface within a mobile or desktop application. The resource system 300 can be operated by a service provider and the data resources associated with the system include information related to the service offered by the service provider. For example, a resource system 300 operated by a telecommunications service provider includes resources such as account details for telecommunications customers, documents answering common customer questions, or portals where customers can perform actions related to their accounts (such as paying a bill, subscribing to a new service, or canceling a service subscription).

In some implementations, the resource system 300 is associated with a support system 304 (e.g., a session system, a customer support system) with which user devices 302 initiate communication sessions. For example, users of the devices 302 initiate communication sessions with the support system 304 to obtain assistance with questions related to a service associated with the resource system 300. The support system 304 can include automated support functions (such as chatbots or interactive voice response systems), human-operated support functions, or a combination thereof.

Some user questions directed to the support system 304 are questions that are answered by resources that are available in the resource system 300. Accordingly, the resource system 300 implements aspects of the disclosed technology in connection with a load management and/or a volume reduction operation for the support system 304. In particular, the resource system 300 identifies particular data resources that are predicted to obviate a need for users to initiate communication sessions (e.g., telephone calls, voice calls, video conferences or sessions, instant messaging sessions) with the support system 304, and accordingly, the resource system 300 diverts communication, computing, and network load away from the support system 304.

Thus, in some implementations, aspects of the disclosed technology address technical challenges related to significant communication session volume and load for customer support systems. For example, a significant amount of communication sessions handled by customer support systems involve users requesting information that is available in the resource system 300. Performance and efficiency of the customer support system suffers as a result of users being unaware of available resources or being unable to find or navigate to a relevant resource. Such users then rely on the customer support systems to directly provide the requested information. An ability of customer support systems to address more significant issues and handle communication sessions with a higher priority is then improved according to aspects of the disclosed technology that relate to intelligently, predictively, and anticipatorily providing relevant information to users before the users initiate communication sessions to request the relevant information.

The resource system 300 generates dynamic user interfaces for navigating a corpus of resources by leveraging historical data 306 that describes behavior of historical users and extracting particular behaviors that reduced the communication activity of the historical users. According to aspects of the disclosed technology, the resource system 300 uses the extracted behaviors to identify certain data resources that were accessed and/or retrieved by certain historical users who did not initiate communication sessions with the support system 304 and that were not accessed/retrieved by other historical users who did initiate support system communication sessions. As such, the certain data resources are understood and identified as having at least a threshold utility or usefulness to the historical users such that a need of the historical users to initiate communication sessions with the support system 304 is obviated or precluded. Additionally, leveraging the historical data 306 may have the effect of identifying particular resources that are historically or routinely difficult for users to find within the resource system (since users may have a greater tendency to request assistance from the support system 304 when a relevant resource is more difficult to locate).

The historical data 306 leveraged by the resource system 300 includes at least two particular aspects that are correlated against one another to identify the certain data resources having utility or usefulness. First, the historical data 306 includes historical communication data that describes communication activity of the historical users (e.g., call records or logs, messaging transcriptions, video recordings). In some implementations, the communication data describes a number of communication sessions (e.g., telephone calls, voice calls, video conferences or sessions, instant messaging sessions) initiated by the historical users, a total duration of communication sessions initiated by the historical users, a time at which a communication session was initiated, and/or the like. In some implementations, the communication data describes communication sessions related to each of the historical users. Accordingly, from the historical data 306, the resource system 300 is able to identify a first user segment that is active in initiating communication sessions and a second user segment that is non-active in initiating communication sessions. In some implementations, the historical communication data includes or is used to identify topics or categories of data resources that users inquire about during communication sessions. For example, users may frequently call support concerning billing issues, and billing is identified as a frequently communicated topic from the historical data 306.

Second, the historical data 306 includes historical resource data or historical navigational data that describes usage of particular data resources (e.g., webpages, videos, interactable resources, manuals or documents) by historical users, retrieval of data resources by particular historical users, and/or the like. In an example, the historical navigational data indicates a number of instances or a frequency that a particular data resource was accessed/retrieved by historical users, a plurality of instances or timestamps that a particular data resource was accessed/retrieved, and/or the like. In an example, the historical navigational data indicates a listing or sequence of data resources accessed/retrieved by a particular historical user.

With both aspects of the historical data 306, the resource system 300 is equipped to correlate communication activity and resource access/retrieval activity of historical users. By doing so, the resource system 300 is configured to identify particular data resources that are assumed to be useful due to a lack of communication sessions initiated after the particular data resources are accessed by historical users. In some implementations, the resource system 300 is configured to correlate the two aspects of the historical data 306 by first identifying active users and non-active users from the historical communication data and then analyzing respective historical navigational data for the active users and the non-active users. In some implementations, the resource system 300 is configured to correlate the two aspects of the historical data 306 by evaluating or scoring each of a set of data resources based on analyzing historical communication data corresponding to users identified by the historical navigational data for each data resource.

In some implementations, the resource system 300 is configured to perform other correlation and/or analysis techniques to identify and extract particular data resources that historically reduced communication session volume. For example, the resource system 300 implements machine learning models that output predictive weights for a set of data resources based on a likelihood that each data resource was correlated with communication session activity. In some embodiments, the resource system 300 weights a result set of data resources based on the historical communication data. In some embodiments, for a given user who has called the support system, the resource system 300 updates a set of recommended data resources based on a call topic extracted from the historical communication data.

In some implementations, the resource system 300 uses a model (e.g., a statistical model, a ML model) that finds a predetermined (e.g., one, two, five, ten) number of topics that a given cohort of users communicate with the support system 304 about most frequently (e.g., as defined in the historical communication data), and the resource system 300 identifies data resources to provide to the given cohort based on the "frequent" topics. In some implementations, the resource system 300 stores a mapping and/or a relationship database that corresponds predefined call topics with certain data resources. As such, given a particular call topic, the resource system 300 identifies the certain data resources corresponding to (e.g., labelled or tagged according to) the particular call topic. In some implementations, the resource system 300 associates a topic frequency (e.g., how frequently the corresponding topic was the subject of communication with the support system) with each data resource as a feature or input parameter for an ML model that is used to determine whether to recommend the data resource to a given user.

A "model," as used herein, can refer to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of an n-gram occurring in a given language based on an analysis of a large corpus from that language. Examples of models include neural networks, support vector machines, decision trees, Parzen windows, Bayes, clustering, reinforcement learning, probability distributions, decision trees, decision tree forests, and others. Models can be configured for various situations, data types, sources, and output formats.

In some implementations, the model can be a neural network with multiple input nodes that receive features or parameters relating to data resources and usage as defined in historical communication data and historical navigational data, such that the model produces results that indicate whether or not a given data resource is relevant to a user or not. In some implementations, the multiple input nodes receive features relating to a given user (e.g., tenure, device type, call frequency) such that the model outputs results that identify recommended data resources to provide to the given user. The input nodes can correspond to functions that receive the input and produce results. These results can be provided to one or more levels of intermediate nodes that each produce further results based on a combination of lower-level node results. A weighting factor can be applied to the output of each node before the result is passed to the next layer node. At a final layer, ("the output layer") one or more nodes can produce a value classifying the input that, once the model is trained, can be used as a weight for a data resource indicating whether to provide the data resource to a user, an identifier for one of multiple predefined sets of data resources to provide to a user, an identifier for a particular data resource to provide to a user, a cohort to assign a user to, and/or the like. In some implementations, such neural networks, known as deep neural networks, can have multiple layers of intermediate nodes with different configurations, can be a combination of models that receive different parts of the input and/or input from other parts of the deep neural network, or are convolutions—partially using output from previous iterations of applying the model as further input to produce results for the current input.

According to some implementations, the historical data 306 further includes profile data, account data, user-specific or demographic data, and/or the like associated with various users. For example, the historical data 306 includes account data for users associated with the support system 304 and/or the resource system 300. In some implementations, such user-specific data describes demographic characteristics or attributes, a location or geographic region associated with the user, a tenure (a time since the user-specific data was created, a time since the user is registered or known to the resource system 300 and/or the support system 304), relationships between users, user devices associated with the users and attributes thereof, and/or the like.

With the historical user-specific data, the resource system 300 is configured to define user cohorts based on specific user-specific characteristics or attributes. In some implementations, selection of data resources (e.g., via the correlation of the historical communication data and the historical navigational data) is further controlled by user cohorts. For example, the resource system 300 is configured to correlate portions of the historical communication data and the historical navigational data that correspond to historical users of a given user cohort, in order to select data resources to provide to current users belonging to the given user cohort. By doing so, the predicted likelihood that the selected data resources are relevant and useful to the current users such that the current users do not initiate communication sessions is increased.

In some implementations, example cohorts determined by the resource system 300 (e.g., using the historical user-specific data of the historical data 306) include tenure cohorts. Tenure cohorts are defined based on tenure of users, or an elapsed time since respective user-specific data (e.g., account data) was created. According to some aspects of the disclosed technology, tenure cohorts are defined because users of similar tenure tend to initiate communication sessions with customer support for similar reasons. For example, topics including account set-up, device set-up, onboarding information, basic billing or payment information, and/or the like are commonly relevant to early tenure users of a telecommunications service. In this example, by analyzing historical data 306 for historical early tenure users, data resources specifically relevant and useful to early tenure users (based on reduced session volume) are selected and provided to a given user that is also an early tenure user.

Other example cohorts include cohorts defined by device-type. Users associated with similar devices or a common device type initiate communication sessions due to common issues related to the similar devices. Thus, in an example, identifying data resources accessed by historical users in the given device cohort who did not initiate communication sessions with the support system 304 allows the identified data resources to be proactively provided to other users also in the given device cohort. In some implementations, other example cohorts further include demographic cohorts, location-based cohorts, age-group cohorts, and/or the like.

In some implementations, the historical data 306 is dynamically generated and managed by the resource system 300 and/or the support system 304. For example, the support system 304 generates and stores the historical communication data in response to communication sessions with historical users, and the resource system 300 generates and stores the historical navigational data in response to historical users accessing/retrieving resources of the resource system 300.

As discussed herein, the resource system 300 is configured to use the historical data 306 to identify particular data resources to proactively provide to a given user, and various such functionality of the resource system 300 is embodied by a user-classification module 312, a resource-identification module 314, and a dynamic-interface module 316, according to some implementations (e.g., the illustrated implementation of FIG. 3).

In some implementations, the user-classification module 312 is configured to determine user segments of a population of users that relate to how active users are with initiating communication sessions with the support system 304. For example, historical users are classified as either active or non-active according to a threshold number of communication sessions initiated with the support system 304, a threshold cumulative length of time spent in communication sessions, a threshold frequency at which the historical users initiate the communication sessions, and/or the like. In order to classify historical users as active or non-active, the user-classification module 312 uses the historical communication data in the historical data 306.

In some implementations, the user-classification module 312 is further configured to define user cohorts and classify historical users on a cohort-wise basis. In some implementations, the user-classification module 312 is configured to use profile or account data for the historical users to define cohorts to which the historical users belonged at the time each historical user initiated a communication session or accessed a resource of the resource system 300.

In some implementations, the resource-identification module 314 is configured to identify particular data resources to provide to a given user device 302. In particular, the resource-identification module 314 operates with the user-classification module 312 to identify data resources accessed by different historical users. In some implementations, the resource-identification module 314 is configured to correlate historical navigational data with historical users classified as active and historical users classified as non-active to identify data resources retrieved or accessed by each user, by each user segment, by each user cohort, and/or the like. In doing so, the resource-identification module 314 is configured to identify particular data resources that are retrieved or accessed by historical users classified as non-active and that are not retrieved or accessed by historical users classified as active. The resource-identification module 314 is configured to determine to provide or indicate the particular data resources to one or more particular user devices 302 based on the expectation that the particular data resources include information that precludes or obviates a need for the users to initiate communication sessions with the support system 304.

In some implementations, the dynamic-interface module 316 is configured to provide and indicate the particular data resources (identified by the resource-identification module 314) to particular user devices 302 (e.g., identified by the resource-identification module 314, identified by the user-classification module 312). In some implementations, the dynamic-interface module 316 is configured to cause a display interface to be provided at a user device 302, with the display interface indicating the particular data resources. For example, the display interface includes interactable links via which a user navigates or retrieves a particular data resource (e.g., a webpage). In some implementations, the dynamic-interface module 316 is configured to update a display interface being presented on a user device 302 such that links or references to the particular data resources (identified by the resource-identification module 314) are emphasized over links or references to other data resources.

Figure 4:
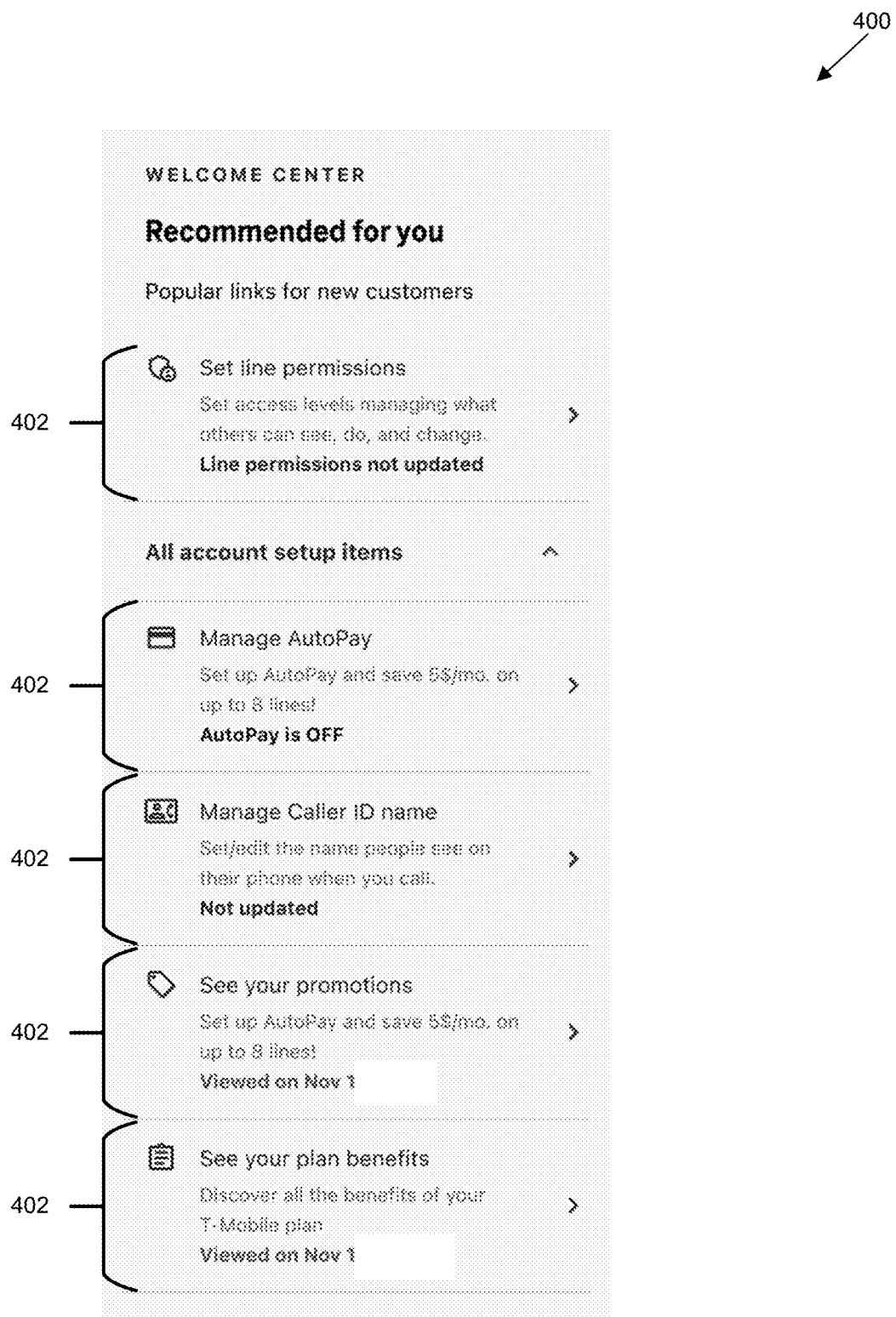
FIG. 4 illustrates an example user interface provided to a user device to reduce communication session volume.

FIG. 4 illustrates an example dynamic interface 400 presented at a user device 302 by the resource system 300. For example, the dynamic interface 400 illustrated in FIG. 4 is generated and/or updated by the dynamic-interface module 316 of the resource system 300. As illustrated, the dynamic interface 400 indicates a plurality of data resources 402. In the illustrated example, the data resources 402 are webpages that include text-based information, and the dynamic interface 400 includes links, digital references, or other user-interactable features via which the user of the user device 302 accesses or retrieves the data resources 402. The dynamic interface 400 can be displayed, for example, as a landing page after a user logs into an account associated with the resource system 300, as a landing page when a user launches an application associated with the resource system 300, or in a persistent sidebar within a website or application, in order to improve navigation of the resource system's website or application.

According to the disclosed technology, the dynamic interface 400 dynamically indicates or emphasizes one or more particular data resources that are predicted to reduce a volume of communication sessions. In the illustrated example, the dynamic interface 400 indicates a data resource 402 titled "Set line permissions" above other data resources 402, as the data resource 402 titled "Set line permissions" is predicted (e.g., by the resource system 300) to provide relevant information to the user of the user device 302, such that the user device 302 does not need to initiate a communication session with the support system 304.

In some implementations, the data resources 402 in the dynamic interface 400 are dynamically ordered, emphasized, or indicated in response to the resource system 300 identifying particular data resources that include relevant information for the user of the user device 302. For example, operations performed by the resource system 300 to identify the particular data resources occur at a periodic basis, occur dynamically in response to certain triggers or events, and/or the like, and the dynamic interface 400 dynamically indicates the particular data resources in response to the particular data resources being identified.

The illustrated example of FIG. 4 indicates one particular data resource ("Set line permissions") as a data resource predicted to reduce communication session volume; however, it will be appreciated that the dynamic interface 400 is configured to indicate more than one such particular data resource. In some examples, the dynamic interface 400 indicates a plurality of particular data resources predicted to reduce communication session volume. In some examples, the plurality of particular data resources are indicated in a sequential order (e.g., vertically across the dynamic interface 400) based on how likely the particular data resources are relevant to the user of the user device 302, based on how frequently historical users accessed/retrieved the particular data resources, whether or not the user has previously accessed/retrieved any of the particular data resources, and/or the like. To do so, current navigational data that describes data resources accessed by the user is used to identify any of the particular data resources already accessed by the user.

Example Operations for Reducing Session Volume

Figure 5:
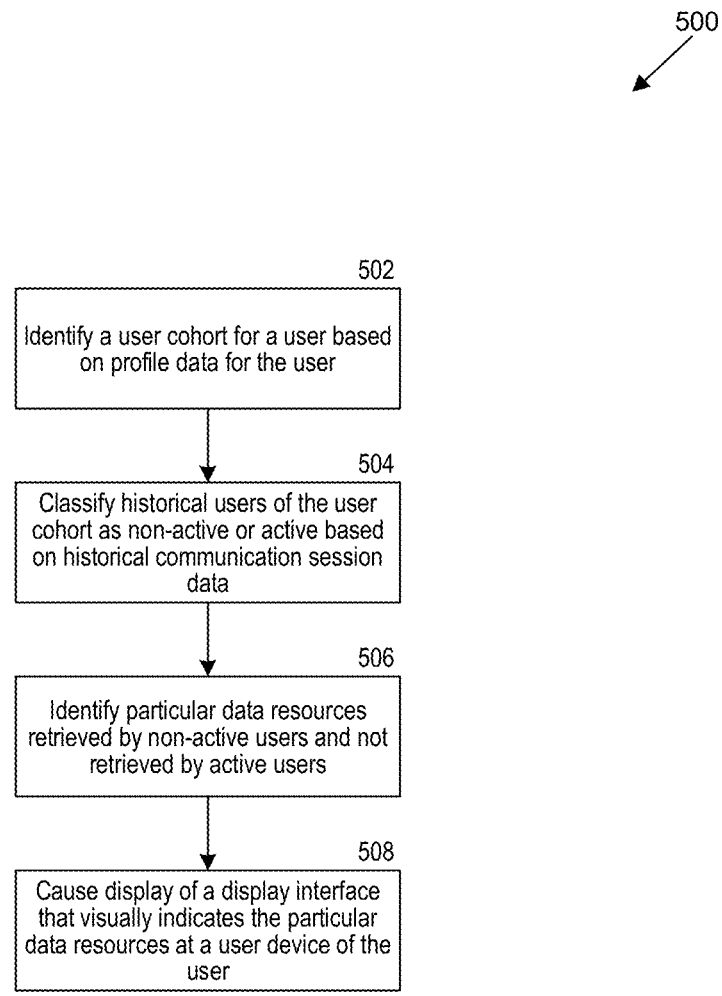
FIG. 5 is a flow diagram that illustrates example operations related to providing dynamic interfaces for curated sets of resources, according to some implementations.

FIG. 5 illustrates a flow diagram that includes example operations for providing dynamic interfaces with intelligently selected data resources. In an example implementation, the flow diagram of FIG. 5 describes operations performed by a resource system (e.g., resource system 300 of FIG. 3) that hosts, manages, references, retrieves, stores, and/or the like a set of data resources (e.g., webpages, videos, interactable resources, manuals or documents). For example, the resource system performs the example operations to improve efficiency of user navigation through the resource system and to reduce a volume of communication sessions handled by a customer support system associated with the resource system. In an example implementation, at least some of the operations illustrated in FIG. 5 are performed by a support system, platform, network, and/or the like (e.g., a customer support system) with which user devices initiate communication sessions. In an example embodiment, a resource system and a support system are embodied by functionalities provided by a computing system, and the computing system performs the operations illustrated in FIG. 5. In the following description, reference to a system can refer to one or more of a resource system, a support system, or a computing system embodying each of the resource system and the support system.

In some implementations, the process or method illustrated in FIG. 5 is performed in response to a triggering event for reducing a volume of communication sessions. For example, the process of FIG. 5 is performed in response to detecting that a volume of communication sessions with the support system 304 has increased by at least a threshold rate over a time period, and/or detecting that the volume of communications sessions is at least a threshold volume. Similarly, the process of FIG. 5 is triggered in connection with a load management operation for the support system 304. In another example, the process of FIG. 5 is performed in response to a prediction that an upcoming event (e.g., a release of a new phone, the start of a new billing cycle) will cause an increased volume of communication sessions. In yet another example, the process of FIG. 5 is performed in response to a given user transitioning to another cohort (e.g., from a "new user" tenure cohort to an "experienced user" tenure cohort, from a first geographical cohort to a second geographical cohort), such that information relevant to the new cohort can be preemptively provided to the given user. In yet another example, the process of FIG. 5 is performed in response to detecting an access to the resource system 300 by the user device 302 of a given user. In some implementations, the process of FIG. 5 is performed periodically such that relevant information is dynamically provided to a given user.

At 502, a system identifies a user cohort for a user. In some implementations, the system uses profile data for the user to identify the user cohort. In some examples, the user belongs to a tenure cohort according to a length of time since profile data or account data for the user was generated, or a length of time since the user first accessed or retrieved a data resource of the resource system 300. For example, the user belongs to a "new user" tenure cohort based on account data for the user being generated up to a month prior or based on the user first accessing a data resource recently. In some examples, the user additionally or alternatively belongs to an age cohort, a device-type cohort, and/or the like. Thus, a user cohort includes users having at least one similar characteristic. Beyond user-specific characteristics, a user cohort can be defined based on similar activity performed by users. For example, the user belongs to a cohort of users looking for discounts before a holiday season, a cohort of users that indicate interest in a new phone device when the new phone device is released, a cohort of users who spend less than a threshold amount of time accessing data resources, and/or the like.

By identifying one or more user cohorts for a user, data resources that are specifically relevant to the user on a cohort-basis can be identified. In particular, identifying user cohorts for a user enables identification of historical users that are similar to the user, such that historical behavior can be analyzed to provide relevant data resources to the user. Thus, identifying a user cohort for the user improves an accuracy and/or specificity of resource identification for the user.

In some implementations, the system includes an application programming interface (API) that enables returns cohort information when queried with an indication of the user. For example, the API indicates one or more cohorts to which the user belongs in response to being provided with a user identifier (e.g., a token, a unique identification or number, a globally unique identifier, a universally unique identifier, a username or phone number, a hash of any of the aforementioned examples). In some examples, the API is queried by a user device 302 of the user in connection with the user device 302 determining which data resources to present in a dynamic interface. In some embodiments, the API enables ad-hoc analyses to uncover additional customer insights. For example, the API provides responses to determine if a given customer identified in an API query is likely to call the support system. An example API response can be {"phoneNumber": "4253937644", "Age": "31", "lineCount": "3", "lineType": "Legacy", "sct": "PZIP", "lineRole": ["DL" ], "defaultLine": true, "accountTypeSubType": "IR", "operatorId": 1000, "status": "ACTIVE", "dayssincecall": "26", "CallCount": "2", "lastcalltopic": "Billing", "tenure": "365", "devicetype": "iphone14pro"}.

At 504, the system classifies each of a plurality of historical users that belong to the user cohort as a non-active user or an active user. For example, the system determines, within a population of historical users, a user segment or subset of active users and a user segment or subset of non-active users. In particular, a historical user is classified as either active or non-active based on a degree of activity related to communication sessions with the support system 304. For example, a historical user who frequently initiated communication sessions with the support system 304 is classified as an active user to indicate that the historical user had some informational deficiencies and was not accessing relevant information available to the historical user via the resource system 300. On the other hand, a historical user who did not frequently initiate communication sessions is classified as a non-active user to indicate that the historical use was successful in accessing relevant information via the resource system 300, thereby conserving load at the support system 304.

In some implementations, the system classifies the historical users using one or more thresholds. For example, the system uses a threshold number of initiated communication sessions, a threshold length of time spent in communication sessions, a threshold frequency or rate of initiating communication sessions, and/or the like. In some implementations, the system uses a machine learning model to classify the historical users, and the machine learning model outputs a classification for each historical user given historical communication data for each historical user.

At 506, the system identifies a set of particular data resources retrieved by non-active users and not retrieved by active users. That is, particular data resources that are exclusively retrieved by non-active users are assumed to have been helpful to the non-active users and would have prevented the active users from initiating communication sessions. In some implementations, the system obtains historical navigational data to determine a first set of data resources (e.g., webpages) accessed by the non-active users and a second set of data resources accessed by the active users, and from the first set and the second set, a third set of data resources exclusively accessed by the non-active users can be identified. In some implementations, the system further obtains navigational data for the user to determine which data resources have already been accessed by the user, thereby further personalizing the identified set of particular data resources for the user.

In examples relating to tenure cohorts, the system filters the historical navigational data with respect to the relative tenure of the historical users. For example, if the user belongs to an "early tenure" cohort, the system identifies a set of data resources retrieved by a historical user during a respective "early tenure" time period for the historical user.

At 508, the system causes display of a display interface at the user device of the user, and the display interface visually indicates the particular data resources. For example, the system indicates the particular data resources to the user device, such that the user device presents and/or updates a display interface to indicate the particular data resources. In some implementations, the particular data resources are visually indicated and/or emphasized over other data resources. In some implementations, the particular data resources are visually indicated and/or emphasized relative to one another according to a frequency that that the particular data resources were historically retrieved (e.g., how many non-active users retrieved/accessed each particular data resource).

In some implementations, the particular data resources are visually indicated and/or emphasized relative to one another according to whether the user has previously accessed or retrieved one of the particular data resources. For example, the dynamic interface 400 in FIG. 4 indicates two data resources ("See your promotions" and "See your plan benefits") near a bottom of the dynamic interface 400 due to the two data resources being previously accessed or retrieved by the user.

In some implementations, the display interface is cohort-specific and is provided to the user and other users belonging to the identified user cohort. For example, the display interface is unique to users belonging to an early tenure user cohort. In this example, upon the user leaving the early tenure user cohort, the display interface is no longer presented at the user device. For example, when the display interface is part of a landing page after a user logs into an account on a website associated with the resource system 300, the landing page is modified to present a different display interface, which does not indicate the same particular data resources, when the user leaves the early tenure user cohort. Referring again to FIG. 4, the dynamic interface 400 is specific to a "new customer" user cohort, and upon the user no longer being a new customer, a different display interface that indicates at least one different data resource can be presented for the user.

In some implementations, the display interface presented at the user device is dynamically managed and updated. For example, the system periodically performs 506, and the display interface is dynamically updated to reflect the latest identified set of particular data resources predicted to be relevant to the user. In some examples, indications of data resources (e.g., interactable links or digital references) in the display interface are dynamically relocated to reflect the latest prediction of relevance to the user.

By presenting the display interface that includes the particular data resources, a user is provided with relevant information (e.g., on a cohort-specific level) that is predicted to be relevant to the particular user. The dynamic display interface thus, for example, precludes a need for the user to initiate a communication session with the support system 304. Indeed, more so than presenting data resources with high volume of access, selection/identification of particular data resources that were exclusively accessed by historical non-active users similar to the user improves a likelihood that the particular data resources are specifically relevant to the user. Thus, according to implementations described herein, a volume of communication sessions initiated with a support system 304 is reduced, and technical benefits relating to load and operational efficiency are enjoyed by the support system 304. Additionally, the dynamic display interface can improve navigational efficiency of the resources in the resource system 300. For example, when the resources are webpages within a website or pages within a mobile or desktop application, the display interface dynamically links to the resources determined to be relevant to a particular user without requiring the user to navigate the website or application's predefined structure. As a result, users spend less time navigating and traversing through a large corpus of resources and requesting multiple resources.

Example Computer Systems

Figure 6:
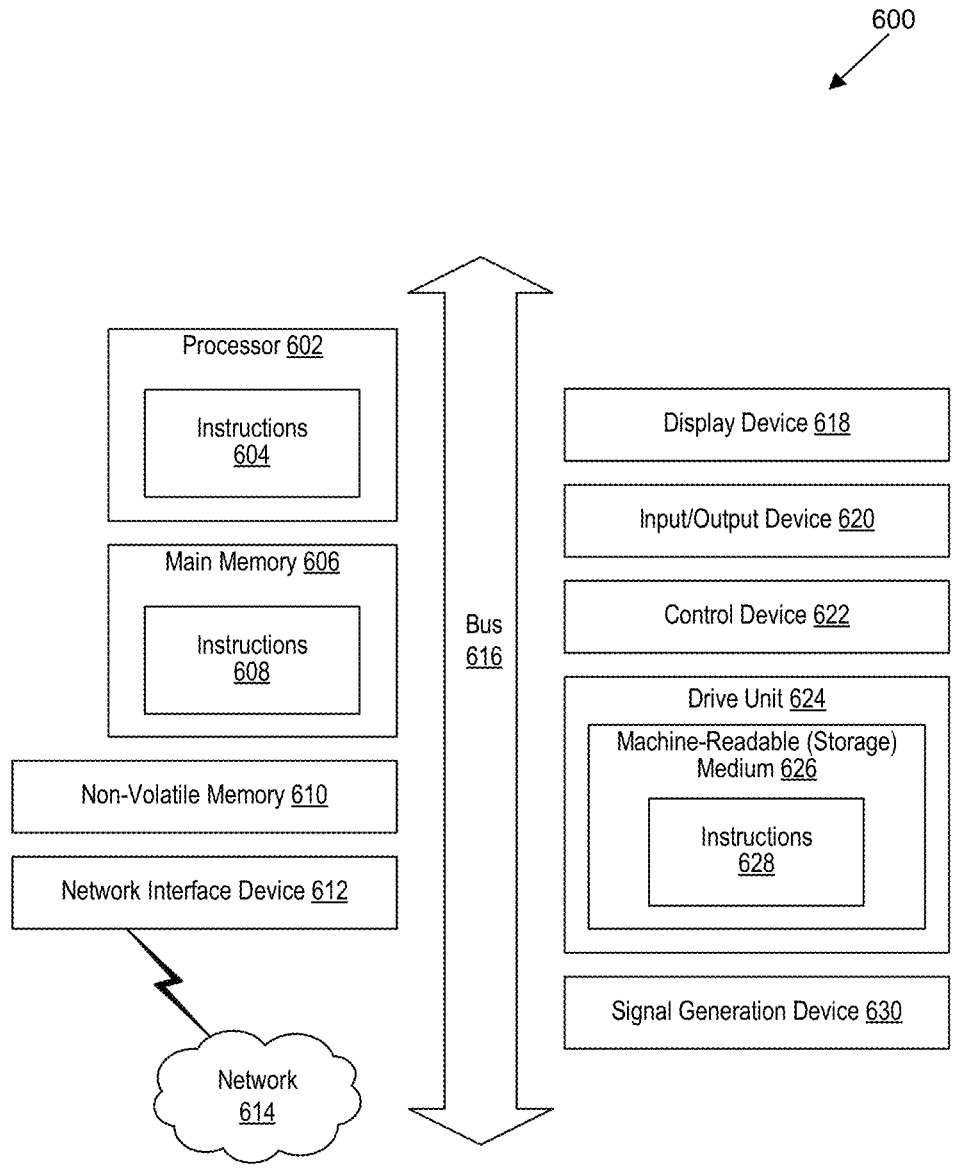
FIG. 6 is a block diagram that illustrates an example of a computer system in which at least some operations described herein can be implemented.

FIG. 6 is a block diagram that illustrates an example of a computer system 600 in which at least some operations described herein can be implemented. In some examples, the computer system 600 implements the resource system 300 of FIG. 3.

As shown, the computer system 600 can include: one or more processors 602, main memory 606, non-volatile memory 610, a network interface device 612, video display device 618, an input/output device 620, a control device 622 (e.g., keyboard and pointing device), a drive unit 624 that includes a storage medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computer system 600 can take any suitable physical form. For example, the computing system 600 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 600. In some implementation, the computer system 600 can be an embedded computer system, a system-on-chip (SOC), a single-board computer system (SBC) or a distributed system such as a mesh of computer systems or include one or more cloud components in one or more networks. Where appropriate, one or more computer systems 600 can perform operations in real-time, near real-time, or in batch mode.

The network interface device 612 enables the computing system 600 to mediate data in a network 614 with an entity that is external to the computing system 600 through any communication protocol supported by the computing system 600 and the external entity. Examples of the network interface device 612 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computing system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computing system 600 to perform operations to execute elements involving the various aspects of the disclosure.

REMARKS

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

The invention claimed is:

1. At least one non-transitory computer-readable storage medium for improved communication session management for a resource platform, the at least one non-transitory computer-readable storage medium storing instructions that, when executed by at least one data processor, cause the at least one data processor to:
   detect an access to the resource platform by a given user device associated with a given user, the access occurring within a relative time period for the given user that is based on a time of creation of an account associated with the resource platform for the given user;

provide, in response to the access, a display interface to the given user device, the display interface visually indicating a plurality of data resources of the resource platform;

determine, from a plurality of historical users associated with the resource platform, a first user segment and a second user segment, wherein the first user segment includes historical users each initiating, within the relative time period for each historical user in the first user segment, less than a threshold number of communication sessions with a customer support system associated with the resource platform, wherein the second user segment includes historical users each having, within the relative time period for each historical user in the second user segment, at least the threshold number of communication sessions with the customer support system associated with the resource platform;

obtain first navigational data for the first user segment and second navigational data for the second user segment, wherein the first navigational data identifies data resources that were retrieved by the first user segment during the relative time period for each historical user in the first user segment, wherein the second navigational data identifies data resources that were retrieved by the second user segment during the relative time period for each historical user in the second user segment;

determine one or more particular data resources that are identified by the first navigational data and not identified by the second navigational data; and dynamically update the display interface to visually emphasize the one or more particular data resources over other data resources of the plurality of data resources.

2. The at least one non-transitory computer-readable storage medium of claim 1, wherein each of the one or more particular data resources are visually emphasized to a respective extent based on a respective frequency by which the first user segment retrieved each of the one or more particular data resources.

3. The at least one non-transitory computer-readable storage medium of claim 1, wherein the instructions further cause the at least one data processor to:

obtain third navigational data that identifies data resources that were previously retrieved by the given user, wherein the one or more particular data resources are not identified by the third navigational data.

4. The at least one non-transitory computer-readable storage medium of claim 1, wherein dynamically updating the display interface includes relocating visual indications of the one or more particular data resources to be above visual indications of the other data resources.

5. A resource system with improved communication session management, the resource system comprising:

a user-classification module configured to classify each of a plurality of historical users as a non-active user or an active user based on a number of communication sessions with a customer support system associated with a resource platform that were initiated by each historical user within a relative time period;

a resource-identification module configured to identify one or more particular data resources of the resource platform that were retrieved by a subset of historical users classified as non-active users and not retrieved by a subset of historical users classified as active users; and a dynamic-interface module configured to:

generating a display interface that visually indicates the one or more particular data resources; and cause the display interface to be displayed at a user device associated with a given user during the relative time period for the given user.

6. The resource system of claim 5, wherein the relative time period for a user is based on a time at which the user first retrieved a data resource from the resource system.

7. The resource system of claim 5, wherein the dynamic-interface module is further configured to dynamically update the display interface displayed at the user device in response to the resource-identification module identifying the one or more particular data resources.

8. The resource system of claim 5, wherein the dynamic-interface module generates the display interface to visually indicate the one or more particular data resources in a sequential order based on a respective frequency at which each particular data resource was retrieved by the subset of historical users classified as non-active users.

9. The resource system of claim 5, wherein the dynamic-interface module generates the display interface to visually indicate the one or more particular data resources in a sequential order based on whether or not the given user has previously retrieved each particular data resource.

10. The resource system of claim 5, wherein the one or more particular data resources were retrieved by the subset of historical users classified as non-active users within the relative time period for each historical user.

11. The resource system of claim 5, wherein a historical user is classified as a non-active user based on the number of communication sessions initiated by the historical user being less than a threshold number.

12. The resource system of claim 5, wherein the one or more particular data resources are webpages, wherein the display interface is generated to include an interactable digital reference for each webpage, and wherein user interaction with a given interactable digital reference causes a corresponding webpage to be provided at the user device.

13. The resource system of claim 5, wherein the dynamic-interface module is further configured to cause a second display interface to be displayed at the user device outside of the relative time period for the given user, wherein the second display interface visually indicates a set of data resources that includes at least one data resource that is not included in the one or more particular data resources.

14. At least one non-transitory computer-readable storage medium storing instructions that, when executed by at least one data processor, cause the at least one data processor to:

obtain historical data for each of a plurality of historical users of a user cohort, the historical data describing a number of communication sessions with a customer support system associated with a resource platform that were initiated by each historical user and identifying data resources retrieved by each historical user;

classify each of the plurality of historical users as a non-active user or an active user based on the number of communication sessions initiated by each historical user;

identify one or more particular data resources that were retrieved by a first subset of the plurality of historical users that are classified as non-active users and not retrieved by a second subset of the plurality of historical users that are classified as active users;

generate a display interface that visually indicates the one or more particular data resources; and cause the display interface to be displayed at a user device associated with a given user of the user cohort.

15. The at least one non-transitory computer-readable storage medium of claim 14, wherein the user cohort is defined by users being within a relative tenure with respect to a time of creation of an account for each user.

16. The at least one non-transitory computer-readable storage medium of claim 14, wherein the user cohort is defined by users having one or more common demographic attributes.

17. The at least one non-transitory computer-readable storage medium of claim 14, wherein the user cohort is defined by users being associated with respective user devices of a same type.

18. The at least one non-transitory computer-readable storage medium of claim 14, wherein the instructions further cause the at least one data processor to:

generate a second display interface that visually indicates at least one data resource different than the one or more particular data resources; and cause the second display interface to be displayed at a second user device associated with a second user that is not included in the user cohort.

19. The at least one non-transitory computer-readable storage medium of claim 14, wherein the instructions further cause the at least one data processor to:

detect the given user is no longer part of the user cohort; and cause a second display interface to be displayed at the user device associated with the given user, wherein the second display interface visually indicates at least one data resource different than the one or more particular data resources.

20. The at least one non-transitory computer-readable storage medium of claim 14, wherein the display interface is generated to visually indicate the one or more particular data resources in a sequential order based on whether or not the given user has previously retrieved each particular data resource.

* * * * *